US010792130B2

(12) United States Patent
Solèr et al.

(10) Patent No.: US 10,792,130 B2
(45) Date of Patent: Oct. 6, 2020

(54) SECONDARY PART, SET, DENTAL IMPLANT, GINGIVA FORMER, IMPRESSION PART, DENTAL IMPLANT SYSTEM, AND METHOD FOR PRODUCING AN IMPLANT

(75) Inventors: Christoph Solèr, Zwingen (CH); Antonio Vaccaro, Maulburg (DE)

(73) Assignee: Camlog Biotechnologies AG, Basel (CH)

( * ) Notice: Subject to any disclaimer, the term of this patent is extended or adjusted under 35 U.S.C. 154(b) by 913 days.

(21) Appl. No.: 14/421,145

(22) PCT Filed: Aug. 13, 2012

(86) PCT No.: PCT/EP2012/065821
§ 371 (c)(1),
(2), (4) Date: Feb. 11, 2015

(87) PCT Pub. No.: WO2014/026706
PCT Pub. Date: Feb. 20, 2014

(65) Prior Publication Data
US 2015/0182309 A1      Jul. 2, 2015

(51) Int. Cl.
*A61C 8/00* (2006.01)
*A61C 13/00* (2006.01)
(Continued)

(52) U.S. Cl.
CPC .......... *A61C 8/0022* (2013.01); *A61C 8/0001* (2013.01); *A61C 8/008* (2013.01);
(Continued)

(58) Field of Classification Search
CPC ... A61C 8/0022; A61C 8/0001; A61C 8/0025; A61C 8/0068; A61C 8/008;
(Continued)

(56) References Cited

U.S. PATENT DOCUMENTS

| | | | | |
|---|---|---|---|---|
| 2,929,102 A | * | 3/1960 | Rappleyea | B29B 13/024 2/9 |
| 3,054,321 A | * | 9/1962 | Macchia | H01R 35/02 403/56 |

(Continued)

FOREIGN PATENT DOCUMENTS

| | | |
|---|---|---|
| DE | 102009015358 A1 | 9/2010 |
| EP | 0896812 | 2/1999 |

(Continued)

OTHER PUBLICATIONS

Russian Office Action issued in corresponding Russian Patent Application No. 2015108743 dated Oct. 27, 2016. pp. 3-5.

(Continued)

*Primary Examiner* — Sean M Michalski
*Assistant Examiner* — Mirayda A Aponte
(74) *Attorney, Agent, or Firm* — Davis & Bujold PLLC; Michael J. Bujold (57) ABSTRACT

The secondary part (17), for securing on and/or in a dental implant, is suitable for receiving a tertiary part. The secondary part (17) has a secondary-part body (22) with a recess (21) on the inside, and a secondary-part screw (20) receivable or received in the recess. The secondary part (17) has a screwing-in mechanism in the form of a contour for receiving a screwing-in tool for screwing the dental implant, connected to the secondary part (17), into a jawbone.

12 Claims, 9 Drawing Sheets

(51) Int. Cl.
  *A61C 13/265* (2006.01)
  *A61C 13/107* (2006.01)
(52) U.S. Cl.
  CPC .......... *A61C 8/0025* (2013.01); *A61C 8/0068* (2013.01); *A61C 8/0083* (2013.01); *A61C 8/0087* (2013.01); *A61C 13/0003* (2013.01); *A61C 8/0048* (2013.01); *A61C 8/0089* (2013.01); *A61C 13/0001* (2013.01); *A61C 13/2656* (2013.01); *Y10T 29/49567* (2015.01)
(58) Field of Classification Search
  CPC ... A61C 8/0083; A61C 8/0087; A61C 8/0048; A61C 8/0089; A61C 13/0003; A61C 13/0001; A61C 13/2656; A61C 8/0075; Y10T 29/49567; A61B 17/8605; A61B 17/863
  USPC .................. 433/77, 172–174; 206/63.5, 368
  See application file for complete search history.

(56) References Cited

U.S. PATENT DOCUMENTS

| | | | |
|---|---|---|---|
| 4,342,477 A * | 8/1982 | McClure | B65D 33/34 24/135 N |
| 4,763,788 A | 8/1988 | Jörnéus et al. | |
| 4,995,810 A * | 2/1991 | Soderberg | A61C 8/0089 433/141 |
| 5,692,904 A | 12/1997 | Beaty et al. | |
| 6,068,480 A * | 5/2000 | Misch | A61C 8/0001 433/173 |
| 6,142,296 A | 11/2000 | Klardie et al. | |
| 6,312,260 B1 | 11/2001 | Kumar et al. | |
| 6,315,562 B1 * | 11/2001 | Kumar | A61C 8/0087 433/141 |
| 6,416,324 B1 | 7/2002 | Day | |
| 6,558,162 B1 | 5/2003 | Porter et al. | |
| 2001/0019816 A1 * | 9/2001 | Kumar | A61C 8/008 433/172 |
| 2002/0025505 A1 * | 2/2002 | Beaty | A61C 8/0001 433/173 |
| 2002/0110784 A1 | 8/2002 | Kumar | |
| 2006/0228672 A1 | 10/2006 | Hurson | |
| 2007/0287127 A1 * | 12/2007 | Schaffran | A61C 8/0089 433/114 |
| 2008/0025817 A1 * | 1/2008 | Hormansdorfer | A61F 2/34 411/387.4 |
| 2008/0227057 A1 | 9/2008 | Anitua Aldecoa | |
| 2008/0254412 A1 | 10/2008 | Korrodi et al. | |
| 2009/0111072 A1 | 4/2009 | Lombardo et al. | |
| 2010/0311011 A1 | 12/2010 | Schwieder et al. | |
| 2011/0106171 A1 * | 5/2011 | Kirschman | A61B 17/8052 606/286 |
| 2011/0306014 A1 | 12/2011 | Conte et al. | |

FOREIGN PATENT DOCUMENTS

| | | | |
|---|---|---|---|
| EP | 1013237 A2 | 6/2000 | |
| EP | 1502558 | 2/2005 | |
| EP | 2218422 | 8/2010 | |
| EP | 1849431 B1 | 3/2011 | |
| EP | 2351536 A1 | 8/2011 | |
| FR | 2929102 | 10/2009 | |
| FR | 2929102 A1 * | 10/2009 | ........... A61C 8/0022 |
| FR | 2969483 | 6/2012 | |
| FR | 2969484 A3 | 6/2012 | |
| JP | H09510124 A | 10/1997 | |
| JP | 3055944 B2 | 6/2000 | |
| JP | 2009247740 A | 10/2009 | |
| JP | 2010187884 A | 9/2010 | |
| JP | 2011511687 A | 4/2011 | |
| JP | 2012016529 A | 1/2012 | |
| KR | 1020090083007 A | 8/2009 | |
| RU | 2273464 C2 | 4/2006 | |
| RU | 2320290 C1 | 3/2008 | |
| RU | 2445937 C2 | 3/2012 | |
| WO | 2004098442 A1 | 11/2004 | |
| WO | 2008/053058 | 5/2008 | |
| WO | 2011055358 A1 | 5/2011 | |
| WO | WO 2011055358 A1 * | 5/2011 | ........... A61C 8/0022 |
| WO | 2012/097955 | 7/2012 | |
| WO | WO 2012097955 A1 * | 7/2012 | ............. A61C 8/005 |

OTHER PUBLICATIONS

Russian Search Report issued in corresponding Russian Patent Application No. 2015108743 dated Oct. 27, 2016. 2 Pages.
Japanese Office Action issued in corresponding Japanese Patent Application No. 2015-526885 dated Jun. 7, 2016.
International Preliminary Report on Patentablity dated Feb. 17, 2015.
European Office Action issued in corresponding European Patent Application No. 12746341.2 dated Mar. 14, 2019.
Japanese Office Action issued in corresponding Japanese Patent Application No. 2018-039739 dated Oct. 8, 2019.

\* cited by examiner

SECONDARY PART, SET, DENTAL IMPLANT, GINGIVA FORMER, IMPRESSION PART, DENTAL IMPLANT SYSTEM, AND METHOD FOR PRODUCING AN IMPLANT

The invention relates to a secondary part, a set comprising the secondary part and a dental implant, a dental implant, a gingiva former, an impression part, a dental implant system comprising the set, and a method for producing the dental implant, with the features of the preambles of the independent claims. Dental implants for the replacement of defective or missing teeth are known. An implant is implanted in the jawbone, and a secondary part called an abutment is fixed on the implant. The secondary part serves as a base for a tooth structure, typically a ceramic body. In the context of the process of incorporation and of the production of the artificial tooth, auxiliary parts are also used, such as gingiva formers, impression parts and scanning bodies.

EP 1 013 237 discloses an assembly set comprising a transport housing, an insertion post and an implant. The implant can be anchored in the jawbone by means of the insertion post, and, after completion of the insertion procedure, the insertion post is removed for receiving a secondary part, for example.

This has the disadvantage that, in the use of the assembly set, there is increased consumption of material, and several steps are needed among other things for removing the insertion post, which can be awkward and can have disadvantages as regards hygiene.

WO 2004/098442 A1 discloses a dental implant with an external thread, and with channel-shaped depressions at the thread root. The dental implant also has axial cutting grooves. This previously known dental implant can have the disadvantage that high torques are needed when screwing the dental implant into the jawbone.

US 2008/0254412 discloses a gingiva former with a continuous bore in which a securing tool can engage.

This gingiva former has the disadvantage that in some cases, on account of the continuous bore, it is not possible to ensure the hygiene in the implant on and/or in which the gingiva former is secured in the intended use.

EP 2 351 536 A1 discloses an adapter which has a flat surface for determining an orientation of an implant-supported tooth replacement by means of a scanning procedure.

This adapter has the disadvantage of permitting only scanning for determining the position of the tooth replacement. Consequently, a large number of different auxiliary bodies are needed for the different functions.

It is therefore an object of the present invention to avoid the disadvantages of the prior art, in particular therefore to make available a secondary part, a set, a dental implant, a gingiva former, an impression part, a dental implant system and a method for producing the dental implant which, in terms of their use, are simple, reliable, hygienic and flexible, and which can be produced inexpensively with reduced consumption of material. A further object is to make available a method for producing a dental implant in a way that is as simple and inexpensive as possible.

According to the invention, these objects are achieved with a secondary part, a set, a dental implant, a gingiva former, an impression part, a dental implant system and a method for producing a dental implant according to the independent claims.

The secondary part according to the invention for securing on and/or in a dental implant is suitable for receiving a tertiary part. The secondary part comprises a secondary-part body with a recess on the inside, and a secondary-part screw receivable or received in the recess. The secondary part has a screwing-in mechanism in the form of a contour for receiving a screwing-in tool, for screwing the dental implant, connected to the secondary part, into a jawbone. In particular, the secondary-part body and/or the secondary-part screw have the screwing-in mechanism in the form of the contour for receiving a screwing-in tool, wherein the contour is preferably formed by the secondary-part body.

Within the meaning of the present application, a secondary part is understood as a part which can be secured on and/or in a dental implant and which is suitable for receiving an auxiliary part or a tertiary part. Within the meaning of the present application, a tertiary part is understood as a part which can be secured on and/or in a secondary part, and in particular a part which is suitable for the phase of incorporation of the dental implant and/or of the temporary or definitive prosthetic restoration. For example, an auxiliary part can be designed as a gingiva former or as an impression part.

After insertion and/or incorporation of the implants in the jawbone in the intended use of the invention described here, these implants can then be treated in accordance with the prior art. These techniques are not therefore discussed in any more detail.

The design of the secondary part with a screwing-in mechanism in the form of a contour has the advantage that, in contrast to what is known from the prior art, an additional screwing-in post is not needed, which reduces the amount of material consumed, and therefore the costs, and simplifies the handling.

Within the meaning of the present application, the term screwing-in mechanism is understood as a contour of the secondary part into which a screwing-in tool can be inserted, such that the secondary part can be screwed into a jawbone with the dental implant by means of the screwing-in tool. In particular, the screwing-in tool can be guided in a rotationally secured manner into the screwing-in mechanism.

Within the meaning of the present application, the designation "A and/or B" is understood as the following possible combinations: A; B; A and B; A and no B; B and no A.

The secondary-part screw and/or the secondary-part body preferably has a self-retaining structure for the screwing-in tool, wherein the self-retaining structure is preferably arranged on a screw head of the secondary-part screw. The self-retaining structure is particularly preferably formed by at least one slit and/or a snap-fit structure. Particularly preferably, the self-retaining structure is designed as a resilient head.

In particular, in the intended use, the screwing-in tool engages around the head with the at least one slit in such a way that the screw head is easily compressed and can thus be held by the screwing-in tool, wherein preferably a snap connection takes place between the snap-fit structure of the self-retaining structure and a snap-fit mechanism of the screwing-in tool. There is therefore no need for any further holding mechanisms or for any further manual support by the dentist.

Within the meaning of the present application, the term self-retaining structure is understood as a structure by means of which the screw head, and if appropriate the secondary part which has received the screw head, can be held by the screwing-in tool without further auxiliary means. For example, this allows the secondary part with the screwing-in tool to be removed from a package and to be brought to the place of use and inserted without any further tools or manual support.

A self-retaining structure for the screwing-in tool on the screw head has the advantage that handling is made easier and safer.

The screw head of the secondary-part screw preferably has, on the outside, a contour for a screwdriver for securing and/or releasing the secondary part on or from the dental implant. In particular, the screw head is designed as an external hexagon.

A screw contour on the outside of the screw head has the advantage of permitting a smaller screw head by comparison with the prior art. More space is therefore available between an inside wall of the secondary part and the screw head, and the inside wall can be produced with a small diameter.

The secondary-part body preferably has, in the area of the screw head, a guide portion for the screwdriver.

Within the meaning of the present application, a guide portion is understood as meaning that the screwdriver, or other instruments if appropriate, can be guided by the secondary-part body when engaging the screw contour of the screw head on the side of the screwdriver directed away from the screw head.

The arrangement of the guide portion has the advantage of permitting an improved and more reliable positioning of the screwdriver on the screw contour.

The recess of the secondary part is preferably designed at least in part as a hexagon socket, wherein the hexagon socket serves in particular as a contour for receiving the screwing-in tool.

This permits simple and reliable handling of the screwing-in mechanism, which saves space. Moreover, the screwing-in tool, for example, can be guided reliably to the self-retaining structure through the portion with the hexagon socket.

The secondary-part body is preferably designed, on the outside, with a contour which, in the intended use, serves to shape the gingiva.

In this way, partial shaping of the soft tissue by the secondary part can take place after the implant has been anchored in the jawbone.

This contour of the secondary-part body and a gingiva former on and/or in the secondary part together form a gingiva contour on the outside.

Moreover, parallel to the longitudinal axis from the apical end towards the coronal end, this contour in particular has in part a concically widening area, which in particular is curved outwards.

Within the meaning of the present application, the apical end is understood as that end of a part which, in the intended use, is directed towards the apex of the tooth. Within the meaning of the present application, a coronal end is understood as that end of a part which, in the intended use, is directed towards the crown of the tooth.

A further aspect of the present invention concerns a secondary part with a secondary-part body, in particular as described above, which has a snap-fit contour for connection to a snap-on auxiliary part, e.g. a gingiva former. In particular, the snap-fit contour is an outer snap-fit contour. Moreover, the connection is in particular releasable. In particular, the secondary part has an anti-twist protection for the auxiliary part.

An outer snap-fit contour has the advantage that an auxiliary part is easy to handle and can be connected reliably to the secondary-part body. Alternatively, an inner snap-fit contour is also possible.

Within the meaning of the present application, an anti-twist protection is understood as meaning that a relative rotation between two or more bodies is substantially prevented.

An anti-twist protection has the advantage that the position of the auxiliary part on and/or in the secondary-part body can be fixed.

The snap-fit contour is preferably designed in such a way that an auxiliary part that can be snapped onto and/or into the secondary part can be pressed, substantially parallel to the snap-on direction, against an abutment face of the secondary part. In particular, the secondary part has a shoulder against which the auxiliary part can be pressed in order to generate pretensioning in the auxiliary part. In other words, therefore, the force generated by the pretensioning in the snap-on direction is taken up by the shoulder.

Within the meaning of the present application, the snap-on direction is understood as a direction from the coronal end to the apical end, i.e. substantially parallel to the longitudinal axis.

Pressing of this kind can be achieved, for example, by the snap-fit contour having a projection and the auxiliary part having a recess, wherein the projection engages in the recess in the snapped-in state. Alternatively, the recess and the projection are reversed between secondary part and auxiliary part. With a suitable arrangement of secondary part or auxiliary part relative to the longitudinal axis, and suitable dimensioning of recess, projection and abutment face, it is possible to achieve pretensioning in the snap-on direction in the snapped-in state. For example, this can be achieved by a recess and by a substantially complementary projection which engage in each other in the snapped-in state and which, relative to the abutment faces of secondary part and auxiliary part, are offset parallel to the longitudinal axis, i.e. axially offset from each other, such that pretensioning arises in the axial direction.

The shoulder is preferably designed to take up a force acting substantially parallel to the longitudinal axis of the dental implant.

Particularly preferably, the outside of the secondary-part body is designed, for the intended use, tapering conically in parts in the direction of the end on which the auxiliary part can be received. In other words, therefore, the secondary-part body is designed tapering conically at least in part towards the coronal end.

This has the advantage that an auxiliary part can be arranged more easily on and/or in the secondary-part body, since the insertion is facilitated by the conical course at the coronal end.

In particular, the angle between the longitudinal axis of the secondary-part body and the conical portion is 5° to 15°, preferably 7.5° to 12.5°, and particularly preferably 9° to 11°.

The secondary-part body preferably has a neck area for receiving the auxiliary part or a tertiary part. In particular, the neck area comprises the snap-fit contour. At least one depression for receiving an adhesive is arranged on the outside in the neck area, in such a way that the secondary-part body can be securely connected in the neck area to a tertiary part.

Within the meaning of the present application, the neck area is understood as that area of the secondary-part body which is directed towards the coronal end and which is suitable for receiving the tertiary part.

The depression is preferably designed extending around the neck area and is arranged in a plane substantially perpendicular to the longitudinal axis of the dental implant.

Alternatively, the peripheral depression in the neck area can have a pitch analogous to a thread and can have one or more thread turns.

Two peripheral depressions are preferably arranged in the neck area and are spaced apart from each other substantially parallel to the longitudinal axis of the dental implant.

The secondary-part screw preferably has at least one predetermined break area. In particular, the predetermined break area is arranged between the screw head and the thread of the secondary-part screw.

A predetermined break area has the advantage that a deformation of the screw head can be avoided.

In particular, the predetermined break area is arranged in such a way that the part of the secondary-part screw between the predetermined break area and the apical end can be removed from the dental implant by means of a removal tool.

The secondary-part body is preferably made of titanium or of a titanium alloy, in particular Ti6Al4V.

Particularly preferably, the secondary-part body has an in particular inner release thread for a release instrument.

Within the meaning of the present application, an inner release thread is understood as a thread which is arranged on the inside in the secondary-part body and in which a release instrument can engage for removing the secondary-part body from the dental implant.

A further aspect of the present invention concerns a set comprising a dental implant and a secondary part. The secondary part is in particular a secondary part as described above. According to the invention, the secondary part is pre-assembled in the dental implant. The secondary part is at the same time designed as a screwing-in mechanism in the form of a contour for receiving a screwing-in tool for the dental implant. In particular, a secondary-part body and/or a secondary-part screw is designed as screwing-in mechanism.

Within the meaning of the present application, the term pre-assembled is understood as meaning that the set is purchased and/or supplied in the assembled state.

The set comprises a secondary part with a screwing-in mechanism, which affords the advantages explained above. Moreover, handling is made even easier by the pre-assembly.

The secondary part is preferably pre-assembled in the dental implant by means of a secondary-part screw.

An additional aspect of the present invention concerns a package containing a set as described above.

The set is therefore packed in particular by the manufacturer and is purchased and/or supplied in a pre-assembled state in a package.

The package preferably contains a sterile set, which advantageously further simplifies the handling of the set, since no further sterilization by the user is needed.

A further aspect of the present invention concerns a dental implant for insertion into a jawbone. In particular, the dental implant is suitable for use with a secondary part as described above. Moreover, the dental implant is in particular suitable for use in a set as described above. The dental implant comprises an external thread for anchoring the dental implant in the jawbone with a thread root, wherein the thread root has at least one elevation. At least two cutting grooves are arranged in the area of the external thread. The cutting grooves are designed as twisted cutting grooves and as at least one short cutting groove and at least one long cutting groove, wherein the short cutting groove is shorter than the long cutting groove.

Alternatively, the cutting grooves can also be oriented parallel to the longitudinal axis of the dental implant.

Within the meaning of the present application, the thread root is understood as the area of the thread located between two adjacent thread flanks. In other words, therefore, an elevation is arranged between two adjacent thread flanks in the thread area.

Within the meaning of the present application, a twisted cutting groove is understood as a groove which is arranged on the outside of the dental implant and which has an axial component parallel to the longitudinal axis of the dental implant and a circumferential component around the dental implant, perpendicular to the longitudinal axis of the dental implant. In other words, a twisted cutting groove has at least in part a course similar to a helical line. In particular, a distance of the twisted cutting groove in a direction perpendicular to the longitudinal axis of the dental implant increases at least in part towards the coronal end in a direction parallel to the longitudinal axis of the dental implant.

The arrangement of at least one elevation at the thread root and the arrangement of twisted cutting grooves of different length has in practice provided a reduction in the necessary screwing-in moment while at the same time achieving a sufficient primary stability and therefore results in good fusion of the dental implant to the jawbone. The elevation at the thread root ideally corresponds to the diameter of the drilling tool.

Moreover, straightforward production with a turning machine is permitted, which is simple and inexpensive.

In particular, the thread is a single-start thread. Alternatively, the thread can be a multiple-start thread.

In particular, the cutting grooves have an angle in the range of 2° to 10° and preferably of 4° to 8° with respect to a surface parallel which runs on the surface, from the coronal end to the apical end, substantially parallel to the longitudinal axis of the dental implant.

The long cutting groove along the longitudinal axis of the dental implant preferably runs across at least the entire external thread.

The external thread preferably covers at least 85%, preferably 89% and particularly preferably at least 91% of the length of the dental implant.

The dental implant preferably has a substantially cylindrical shape in a coronal area directed towards the coronal end.

Within the meaning of the present application, coronal area is understood as that area of the dental implant directed towards the coronal end, wherein the coronal area in particular extends over at least half the length of the dental implant.

Within the meaning of the present application, the term substantially cylindrical is understood among other things as a cylindrical body in which a thread is arranged and/or cut into the outside.

The substantially cylindrical shape of the coronal area has the advantage that further improved anchoring of the dental implant in the jawbone can be achieved, and an inner area of the dental implant for receiving a secondary part is maximized in size in order to connect dental implant and secondary part in a manner that is as flexible and as reliable as possible.

The dental implant, in an apical area directed towards the apical end, preferably tapers substantially conically towards the apical end. In particular, the dental implant is designed as a truncated cone at the apical end.

Analogously to the coronal area, the apical area is understood as that area of the dental implant directed towards the apical end and, starting from the apical end, comprising in particular 3-5 mm, preferably 4 mm, of the length of the dental implant.

The substantially conical design of the apical area has the advantage of providing easier anchoring of the dental implant while ensuring that the least possible screwing-in moment is needed for screwing it into the jawbone.

Three long cutting grooves are preferably arranged on the dental implant, or two short cutting grooves and two long cutting grooves.

Particularly preferably, the short cutting grooves and the long cutting grooves are in an alternating arrangement in the circumferential direction of the dental implant. In other words, viewed in the circumferential direction, a short cutting groove follows a long cutting groove, wherein this applies only to the area of the dental implant in which a short cutting groove and a long cutting groove are arranged, i.e. substantially in the apical area.

The short cutting groove preferably extends from the apical end. The short cutting groove preferably runs across the apical area and particularly preferably about half the length of the external thread, starting from the apical end, parallel to the longitudinal axis of the dental implant.

Preferably, the end of the at least one short cutting groove directed towards the coronal end has, parallel to the longitudinal axis of the dental implant, a groove distance in the range of 3.5 mm to 4.5 mm to the coronal end. The groove distance is preferably 3.7 mm to 4.3 mm and particularly preferably about 4 mm.

Within the meaning of the present application, the groove distance of the short cutting groove is understood as the distance between an end of the short cutting groove directed away from the apical end and the cornal end of the dental implant, wherein the groove distance is measured, parallel to the longitudinal axis of the dental implant, on the surface of the dental implant.

Particularly preferably, at least two elevations, preferably precisely two elevations, are arranged at the thread root between two adjacent thread flanks of the external thread. The elevations are in particular arranged in such a way that three channels are arranged at the thread root between the two adjacent thread flanks.

The diameter of the elevations preferably corresponds to the diameter of a drilling tool used to insert the dental implant. This has the advantage of further reducing the necessary screwing-in moment while providing good fusion of the dental implant with the jawbone.

The at least one elevation is preferably arranged substantially parallel to a thread flank of the external thread.

Within the meaning of the present application, the arrangement of an elevation substantially parallel to a thread flank is understood as meaning that the elevation extends at least in part parallel to the thread flank.

In particular, the elevation has substantially a length corresponding to the length of the thread flank to which the elevation is arranged substantially parallel; the elevation is preferably designed as a continuous elevation interrupted only by the cutting grooves.

The at least one elevation preferably has a lower height than the adjacent thread flanks, measured from the thread root perpendicular to the longitudinal axis of the dental implant.

In particular, the at least one elevation has a height in the range of 10% to 40% of the adjacent thread flank, preferably of 15% to 35% and particularly preferably of 20% to 30%.

Starting from the coronal end, the dental implant particularly preferably has a hollow space for receiving a secondary part on and/or in the dental implant. In the hollow space of the dental implant, an internal thread is arranged for screwing the secondary part to the dental implant. A rotation-securing portion is arranged between the coronal end and the internal thread. Between the coronal end and the rotation-securing portion, a portion is arranged which tapers to the apical end and which is designed in particular as a cone section.

In particular, the secondary part has a shape substantially matching the hollow space of the dental implant, in such a way that the secondary part can be received at least partially in the hollow space of the dental implant.

A rotation-securing portion is understood as a portion by means of which rotational fixing between dental implant and secondary part can be achieved.

A further aspect of the present invention concerns a gingiva former for use with a secondary part as described above. The gingiva former has a structure by means of which the gingiva former can be snapped onto a snap-fit contour of the secondary part and can be connected in particular releasably to the secondary part.

The gingiva former has the abovementioned advantages of the snap-fit contour.

An additional aspect of the present invention concerns a gingiva former in particular as described above. On the side directed away from the secondary part, the gingiva former has an engagement area for a tool for insertion and/or removal of the gingiva former.

The gingiva former is preferably produced from plastic.

This has the advantage of low manufacturing costs, for which reason the gingiva former can be designed as a disposable part.

A further aspect of the present invention concerns an impression part, which can be used in particular with a secondary part as described above. The impression part is suitable for at least any two of the following uses: scanning body, impression body, temporary restoration, incorporation cap.

Within the meaning of the present application, a scanning body is understood as meaning that the orientation of the impression part can be determined by means of an optical method in order to determine the rotational and/or axial position of dental implant and/or secondary part in relation to the anatomical structure.

Within the meaning of the present application, an impression body is understood as meaning that the rotational and/or axial position of dental implant and/or secondary part in relation to the anatomical structure can be determined by means of an impression, for example by taking an impression using an impression compound.

A temporary restoration is understood as a temporary replacement for a missing tooth.

Within the meaning of the present application, an incorporation cap is understood as a closure of the secondary part at the coronal end, so that the healing process can take place under the best possible conditions of hygiene.

Designing the impression part in such a way that at least any two of the uses described above are performed by the impression part has the advantage of improving the costs, hygiene and handling.

In particular, the impression part is designed in such a way that it is suitable as a scanning body and impression body, and also preferably as a temporary restoration.

The impression part preferably has a structure by means of which the impression part can be snapped onto a snap-fit contour of the secondary part and can be connected in particular releasably to the secondary part.

Particularly preferably, the impression part, on the side directed away from the secondary part, has an impression part engagement area for a tool for insertion and/or removal of the impression part.

Within the meaning of the present application, the term impression part engagement area is understood as meaning that the impression part has a recess in which a tool can engage.

The impression part is preferably cylindrical, wherein at least one groove is arranged substantially perpendicular to the cylinder axis, and wherein a substantially flat surface is arranged substantially parallel to the cylinder axis.

A flat surface is understood as a substantially plane surface which nevertheless has a customary surface roughness depending on the method of producing the flat surface. The flat surface is designed such that it can be scanned intra-orally and/or extra-orally by means of optical methods in order to determine the position of the impression part.

By means of the arrangement of at least one groove and the flat surface, the impression part is advantageously suitable for forming a scanning body and an impression body.

At least two, in particular at least three and more particularly four grooves are preferably arranged on the impression part, which are spaced apart from each other substantially parallel to the cylinder axis and in particular extend substantially parallel to each other.

Particularly preferably, the at least one groove and the substantially flat surface are spaced apart from each other, in particular by part of a jacket surface of the impression part.

Within the meaning of the present application, the groove and the flat surface being spaced apart from each other is understood as meaning that the groove does not touch the flat surface.

This arrangement of groove and flat surface has the advantage that an optimal impression accuracy and/or scanning accuracy can be achieved depending on the requirements.

Very particularly preferably, the at least one groove is designed as a straight groove.

The impression part can preferably be worked in order to shape the temporary restoration.

This has the advantage that, after the position has been determined, the impression part can be worked in order to form a temporary prosthetic restoration, which reduces the treatment work and therefore makes the treatment more efficient, which is in turn cost-effective.

A further aspect of the present invention concerns a dental implant system comprising a set as described above and at least one of the following components or desired combinations thereof: gingiva former as described above; impression part as described above; drilling tool for drilling a hole in a jawbone; tool for insertion and/or removal of the impression part and/or of the gingiva former; screwing-in tool for screwing in the dental implant; screwdriver for securing and/or releasing the secondary part on or from the dental implant.

The components of the dental implant system are preferably packed individually in separate packages and/or together in a common package.

The dental implant system is preferably sterilized.

In particular, at least the set and/or one of the components of the dental implant system is sterilized in a suitable package. Preferably, the set and all of the components are sterilized in a suitable package. In particular, the sterilization is carried out by gamma radiation.

An additional aspect of the present invention concerns a method for producing a dental implant as described above using a turning machine, in particular a plain-turning machine. At least the external thread contour of the dental implant is formed with a plain-turning machine by means of a single tool. The cutting grooves can be formed by means of a milling machine in a subsequent step.

This has the advantage that the dental implant can be produced quickly and cost effectively using customary turning machines and without changing tools.

The invention is explained in more detail below by reference to the drawings and in illustrative embodiments, without limiting the invention to these. In the drawings.

Figure 1:
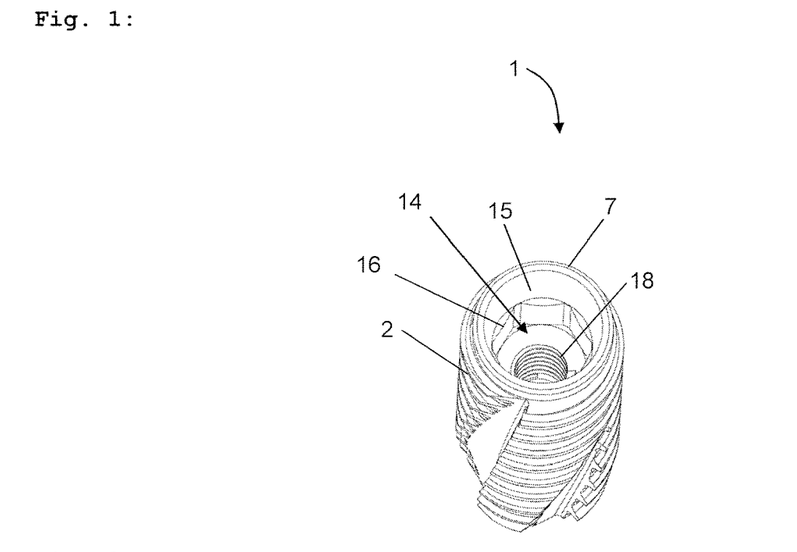
FIG. 1 shows a perspective view of a dental implant according to the invention from above.

In FIG. 1, a dental implant 1 according to the invention is shown from above in a perspective view.

The dental implant 1 has an external thread 2 for anchoring the dental implant 1 in a jawbone. Cutting grooves (not shown in detail here) are arranged in the external thread 2.

The dental implant 1 has a coronal end 7, from which a hollow space 14 of the dental implant extends in part as far as the apical end (not shown here).

The hollow space 14 of the dental implant comprises a cone portion 15, a rotation-securing portion 16 and an internal thread 18. A secondary part can be received at least partially in the hollow space 14 of the dental implant.

Figure 2:
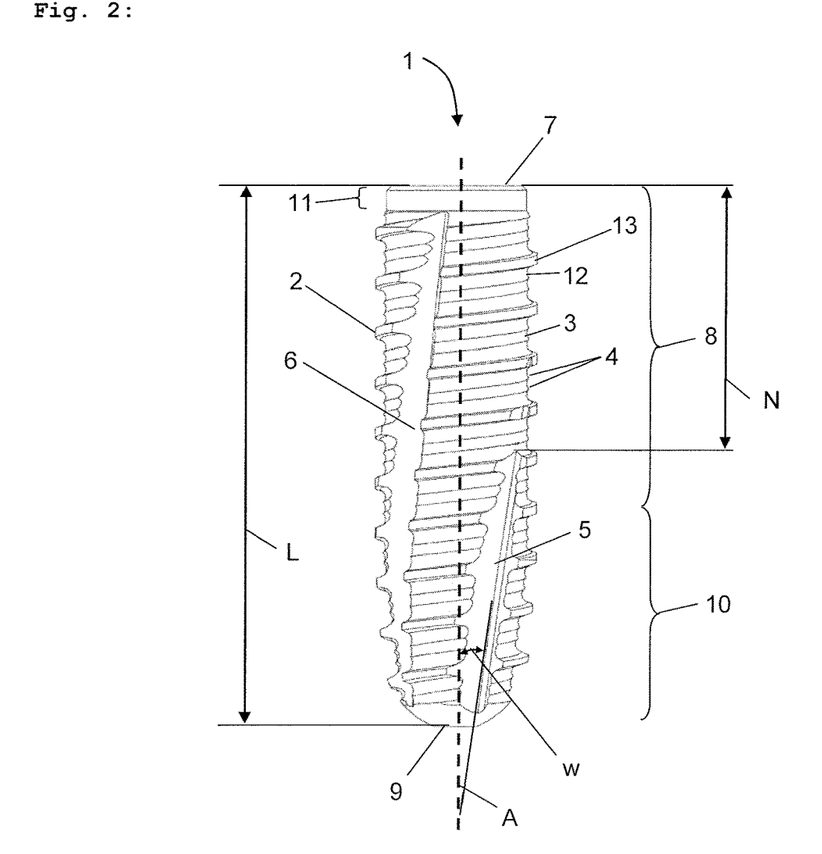
FIG. 2 shows a side view of the dental implant according to the invention from FIG. 1.

In FIG. 2, the dental implant 1 according to FIG. 1 is shown in a side view.

Identical reference signs designate identical features in all of the figures and are therefore only explained again as and when necessary.

Between the coronal end 7 and the area with the external thread 2, the dental implant 1 has a cylindrical area 11.

The external thread 2 is designed as a single-start thread and, between adjacent thread flanks 13, has two peripheral elevations 4, which extend substantially parallel to the thread flanks 13 of the external thread 2. In this way, three channels 12 form between adjacent thread flanks 13. The external thread 2 has a thread root 3.

The dental implant 1 has a coronal area 8, which is directed towards the coronal end 7 and which is substantially cylindrical. Moreover, the dental implant 1 has an apical area 10 which is directed towards an apical end 9 and which tapers substantially conically to the apical end 9. At the apical end 9, the apical area 10 is designed as a truncated cone.

The dental implant 1 according to FIG. 2 has an implant length L of approximately 13 mm, wherein the external thread 2 covers approximately 91% of the length of the dental implant.

Two short cutting grooves 5 and two long cutting grooves 6 are arranged in the external thread 2. Only one short cutting groove 5 and one long cutting groove 6 are visible in the present view.

The short cutting groove 5 has a groove distance N from the coronal end of approximately 4 mm.

A groove angle w between the longitudinal axis A of the implant and the short cutting groove 5 is ca. 4°. The long cutting groove 6 has the same angle to the longitudinal axis A of the implant.

Figure 3:
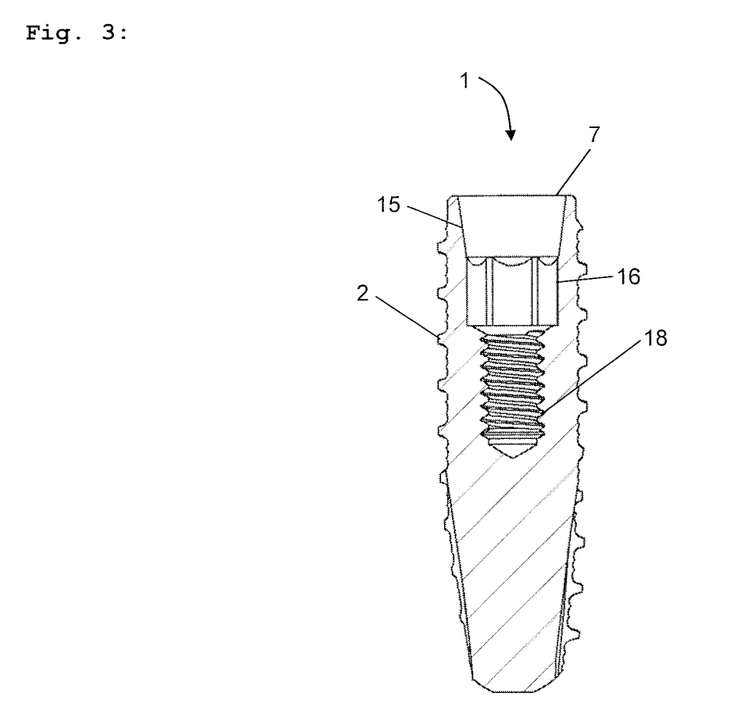
FIG. 3 shows a cross section through a dental implant according to the invention from FIG. 1, illustrating the outline of the hollow space of the dental implant.

In FIG. 3, the dental implant 1 is shown in the view according to FIG. 2, but in FIG. 3 the illustration has been chosen such that the inner contour of the hollow space of the dental implant is visible. Starting from the coronal end 7 and proceeding towards the apical end, the hollow space 14 of the dental implant has the cone portion 15, the rotation-securing portion 16 and the internal thread 18.

Figure 4:
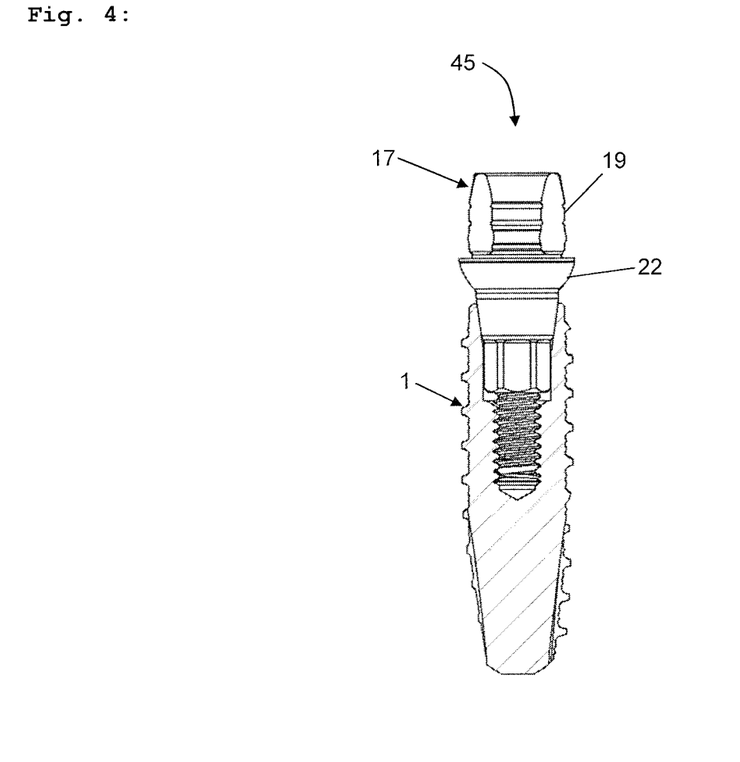
FIG. 4 shows a cross section through the dental implant as shown in FIG. 3, with an assembled secondary part according to the invention.

FIG. 4 shows the dental implant 1 according to FIG. 3. A secondary part 17 with a secondary-part body 22 is received in the dental implant 1. The dental implant 1 and the secondary part 17 are pre-assembled by means of a secondary-part screw, which is only partly visible here, and, in the pre-assembled state, they form a set 45 according to the invention.

On the outside, the secondary-part body 22 has an anti-twist protection 19 for an auxiliary part or tertiary part that is to be received.

Figure 5:
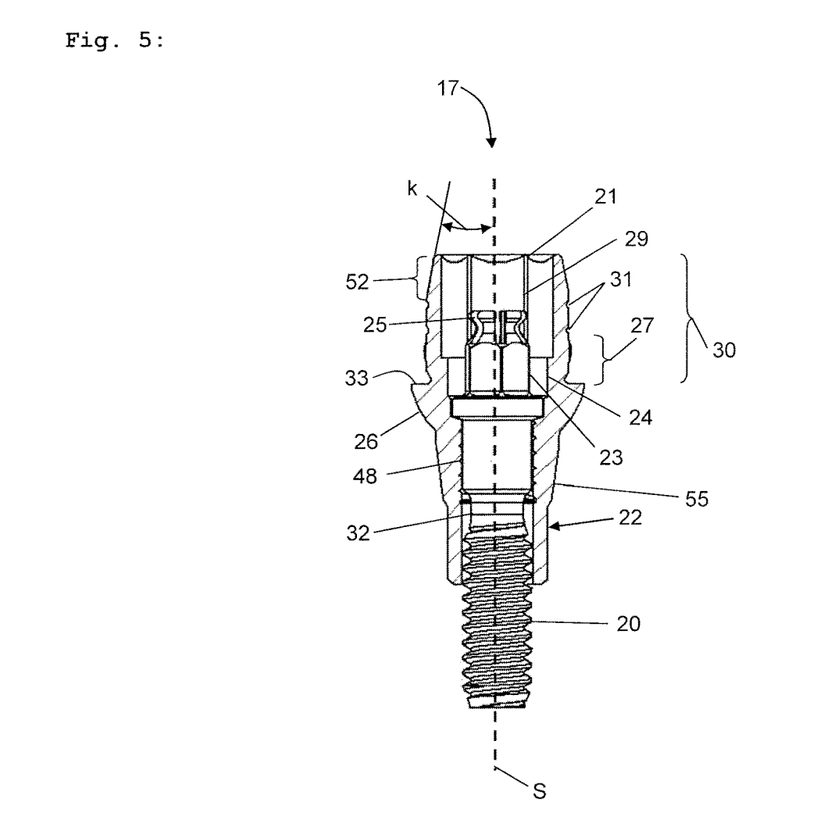
FIG. 5 shows a side view of a secondary part according to the invention cut open parallel to the longitudinal axis of the secondary part, and with a secondary-part screw inserted.

In FIG. 5, a secondary part 17 according to the invention is shown in a side view, the secondary-part body 22 being cut open.

On the inside, the secondary-part body 22 comprises a recess 21 for a secondary-part screw 20. The secondary-part screw 20 has a screw head 23. The screw head 23 is designed as an external hexagon, which functions as a screw contour for a screwdriver for releasing or securing the secondary part 17 on the dental implant 1.

Slits 25 are arranged on the screw head 23, by means of which slits the head is radially compressible, and they function as a self-retaining structure. At least the secondary part 17, comprising the secondary-part body 22, and the secondary-part screw 20 can be held in the engaged state by means of a screwing-in tool when the secondary part 17 is secured on the dental implant by means of the secondary-part screw 20.

In the area of the screw head 23, a guide portion 24 for guiding the screwdriver is arranged on the inside of the recess 21.

Moreover, the recess 21 has a contour designed as a hexagon socket 29 for a screwing-in tool.

Moreover, on the inside of the recess 21, the secondary-part body 22 has a release thread 48 in order to be able to remove the secondary-part body 22 safely and reliably from the implant, for example after removal of the secondary-part screw 20.

The secondary-part screw 20 has a predetermined break area 32 between the screw head and the thread of the secondary-part screw 20. If, for example, too high a torque is applied to the screw head 23, the predetermined break area 32 can break. After removal of the screw head 23, lying above the predetermined break area 32, and of the secondary-part body 22, the thread area of the secondary-part screw 20 can be removed from the implant by means of a further tool.

A tertiary part or an auxiliary part, for example a gingiva former, can be received on the neck area 30 of the secondary-part body 22. At this end, the secondary-part body 22 has a coronal cone 52 extending partially in the circumferential direction. The coronal cone 52 has a coronal cone angle k of approximately 10° with the longitudinal axis of the secondary part.

A neck area 30, which comprises the coronal cone 52 inter alia, is arranged between a shoulder 33 and the end on which the auxiliary part or tertiary part can be received.

In the neck area 30, peripheral depressions 31 are arranged in which an adhesive material can be arranged for the secure connection between secondary part and tertiary part.

Moreover, a snap-fit contour 27 is arranged in the neck area 30, for the possibly releasable connection to an auxiliary part.

On the outside, starting from the shoulder, the secondary-part body 22 has a gingiva-shape partial contour 26, which merges into a secondary-part cone 55. The secondary-part cone 55 is designed such that it can engage in the cone portion of the dental implant.

Figure 6:
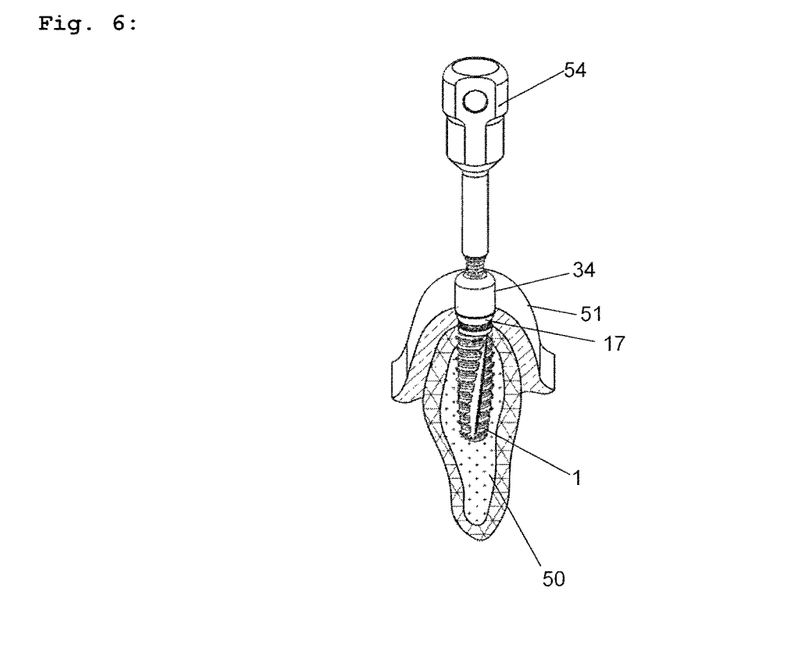
FIG. 6 shows a schematic view of a dental implant inserted in the jawbone, with secondary part, gingiva former, and tool for removing the gingiva former.

FIG. 6 is a schematic view showing a dental implant 1 according to the invention anchored in a jawbone 50.

A secondary-part body 17 with a gingiva-shape partial contour 26 is received in the dental implant 1. On the secondary part 17, a gingiva former 34 is arranged which additionally has the function of an incorporation cap. The soft tissue 51 can be shaped by the arrangement of secondary part 17, with gingiva-shape partial contour, and the gingiva former 34.

By means of a tool 54, the gingiva former 34 can be removed, for example, from the secondary part 17, or can also be inserted.

Figure 7:
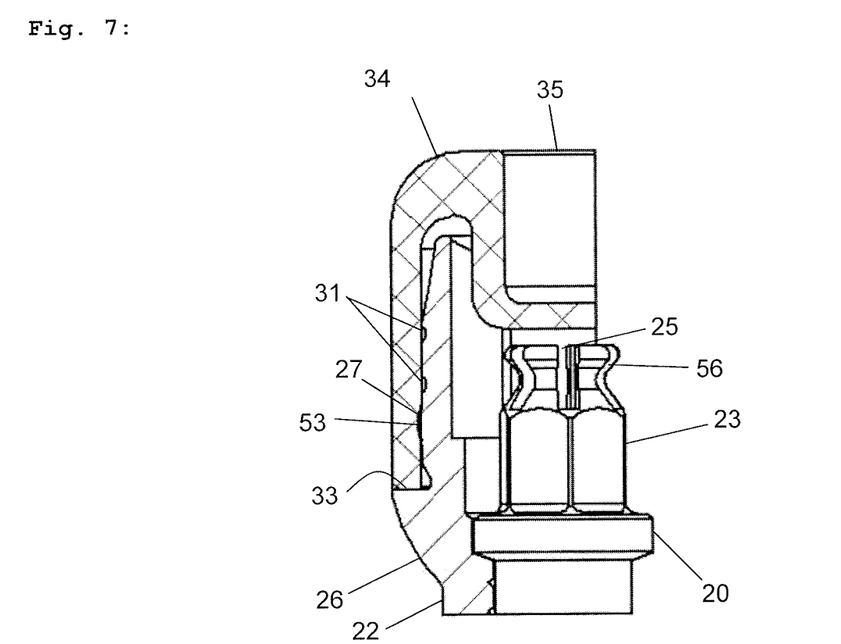
FIG. 7 shows an enlarged detail of the neck area of the secondary part according to FIG. 5, with a received gingiva former.

FIG. 7 shows a detail of the secondary part according to FIG. 5 comprising the neck area. The gingiva former 34 is snapped onto the secondary part comprising the secondary-part body 22. For this purpose, the snap-fit contour 27 is designed as a projection. The gingiva former 34 has a recess 53. In the snapped-in state, the recess 53 is arranged with respect to the projection of the snap-fit contour 27 such that pretensioning is achieved in the direction of the shoulder 33 of the secondary-part body 22. This is achieved by a corresponding axial offset of the recess 53 and of the snap-fit contour 27 from each other in relation to the longitudinal axis of the secondary part, such that the gingiva former 34 is pressed in the direction of the shoulder. The axial distance between the snap-fit contour 27 and the shoulder 33 is therefore smaller than the distance between the recess and the end face of the gingiva former 34 which is pressed onto the shoulder 33.

The screw head 23 has a snap-fit structure 56, which forms a self-retaining structure for a screwing-in tool.

The gingiva former 34 has an engagement area 35 for a tool for inserting or removing the gingiva former 34, as is shown in FIG. 6.

Figure 8:
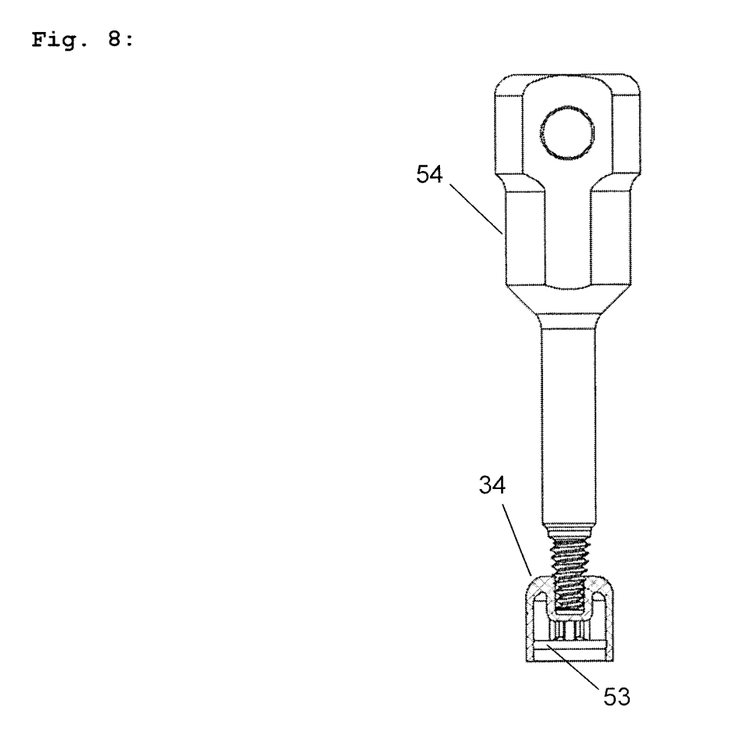
FIG. 8 shows a side view of a cut-open gingiva former, with a tool for handling the gingiva former.

FIG. 8 is a side view showing a cut-open gingiva former 34 with an engagement area in which the tool 54 engages. On the inside, the gingiva former has the recess 53 for connection to a snap-fit contour of the secondary-part body.

Figure 9:
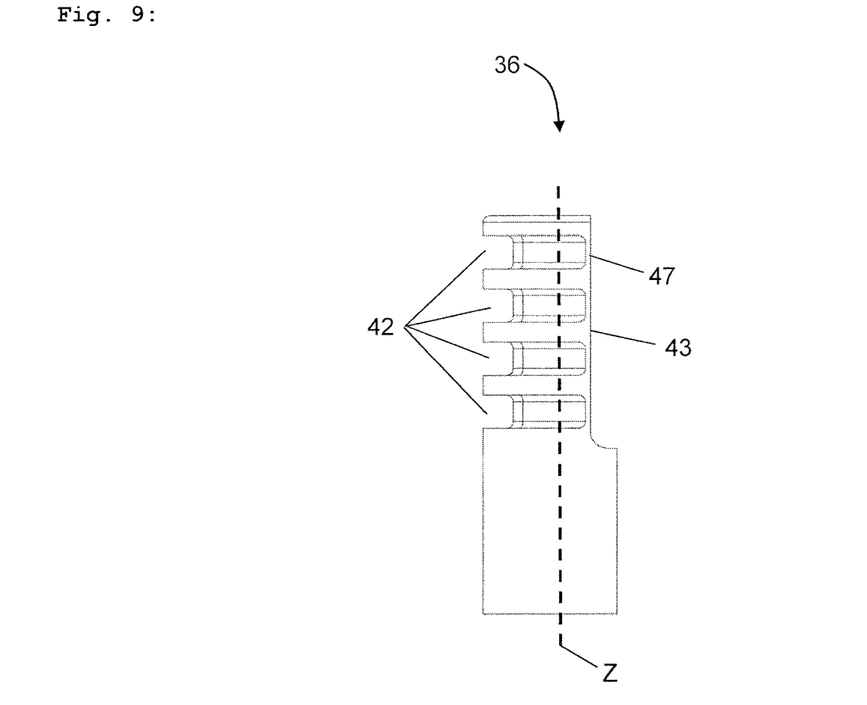
FIG. 9 shows a side view of an impression part according to the invention.

FIG. 9 is a side view showing an impression part 36 according to the invention. The impression part 36 can function as a scanning body, as an impression body, as a temporary restoration or as an incorporation cap, depending on the requirements of the particular use.

The impression part 36 is cylindrical with a cylinder axis Z and has four grooves 42, which are spaced apart from each other substantially parallel to the cylinder axis Z and extend parallel to each other substantially perpendicularly with respect to the cylinder axis Z. In this way, it is possible to define the position of the impression part 36 by use of an impression compound, such that the impression part 36 can function as an impression body.

The impression part 36 also has a flat surface 43, which is spaced apart from the grooves 42 by part of a jacket surface 47 of the cylindrical body. The impression part 36 thereby acquires the function of a scanning body.

The impression part is produced from plastic and can therefore be easily worked to form a temporary restoration.

Figure 10:
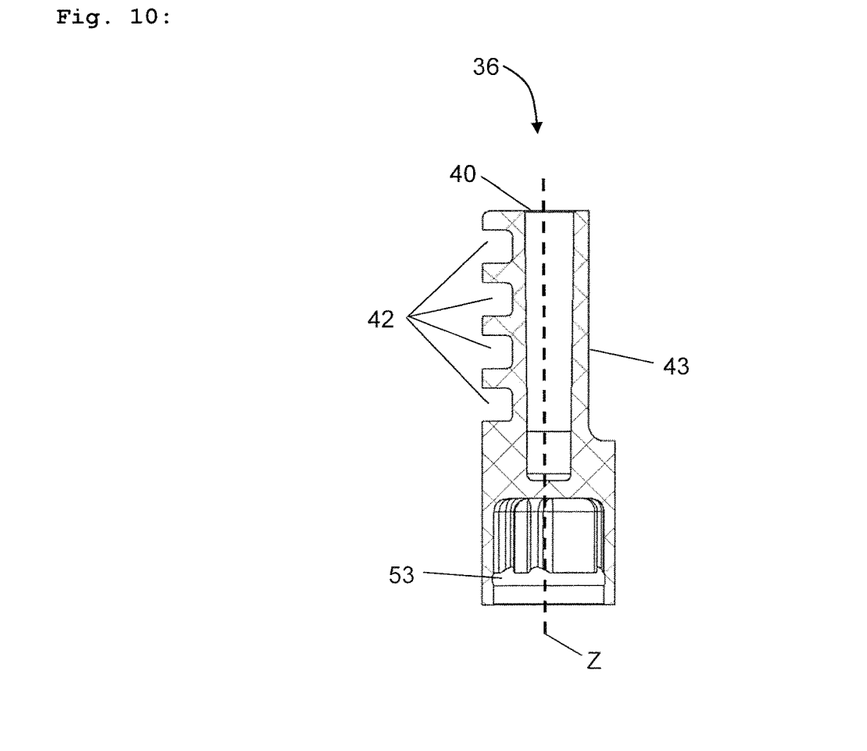
FIG. 10 shows a side view of the cut-open impression part according to FIG. 9.

FIG. 10 shows the impression part 36 according to FIG. 9 in a cut-open side view.

The impression part has an impression part engagement area 40 for a tool for inserting and/or removing the impression part 36. The impression part engagement area 40 extends along approximately half the length parallel to the cylinder axis of the impression part 36.

The impression part 36 has a recess 53 for snapping onto a snap-fit contour of a secondary part.

Figure 11:
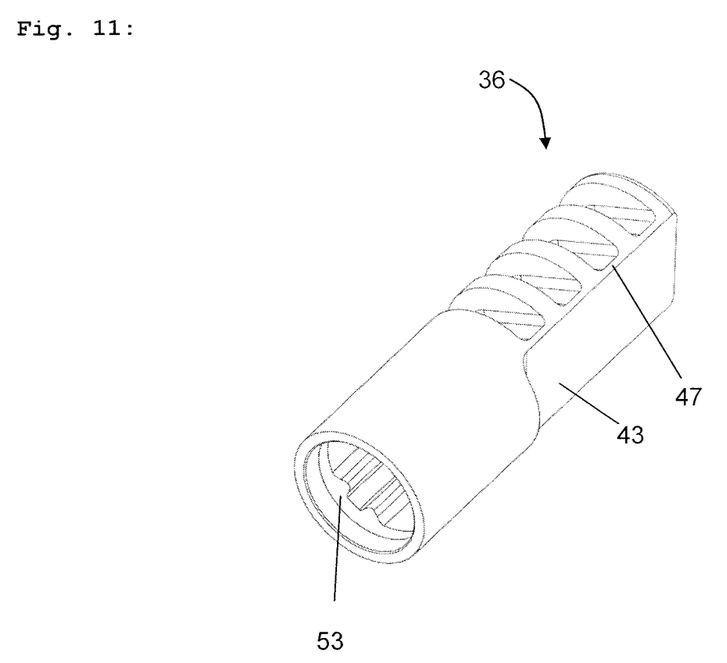
FIG. 11 shows a perspective view of the impression part according to the invention from FIG. 10.

FIG. 11 shows the secondary part 36 according to FIG. 9 in a perspective view.

Figure 12:
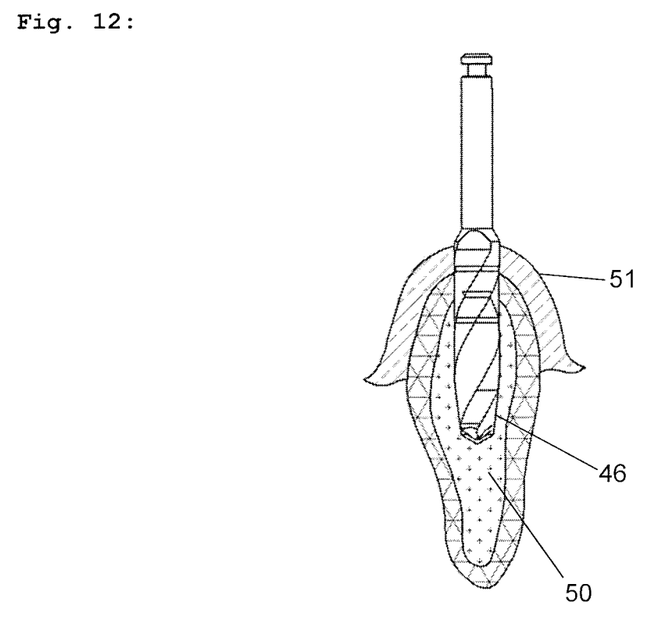
FIG. 12 shows a schematic view of a jawbone with soft tissue and drilling tool.
Figure 13:
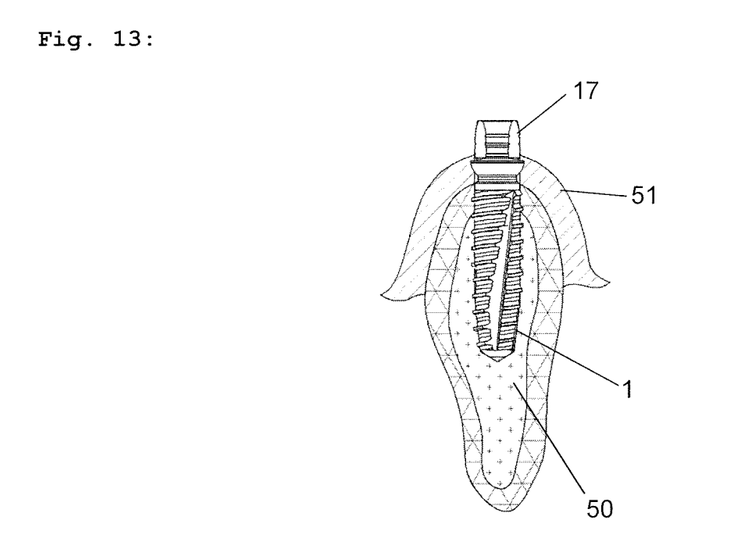
FIG. 13 shows a schematic view of the jawbone with soft tissue according to FIG. 12, with a dental implant according to the invention received in a drilled hole, and with a secondary part according to the invention.
Figure 14:
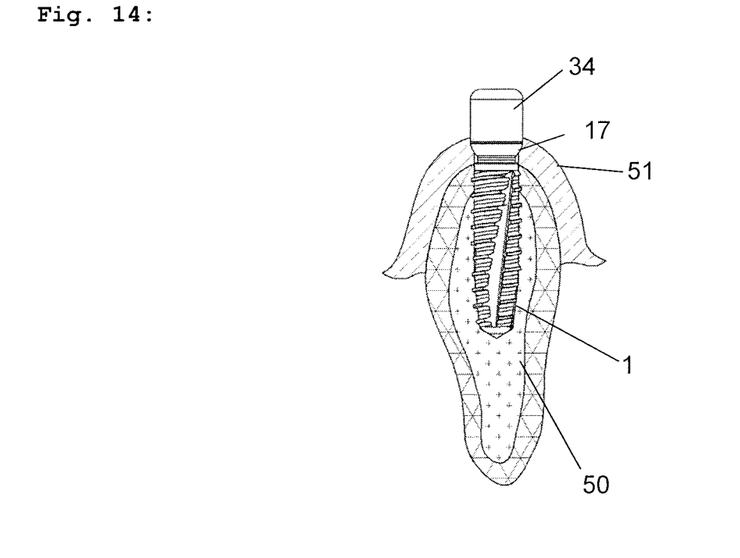
FIG. 14 shows a schematic view of the jawbone with soft tissue according to FIG. 13, with an additional gingiva former.
Figure 15:
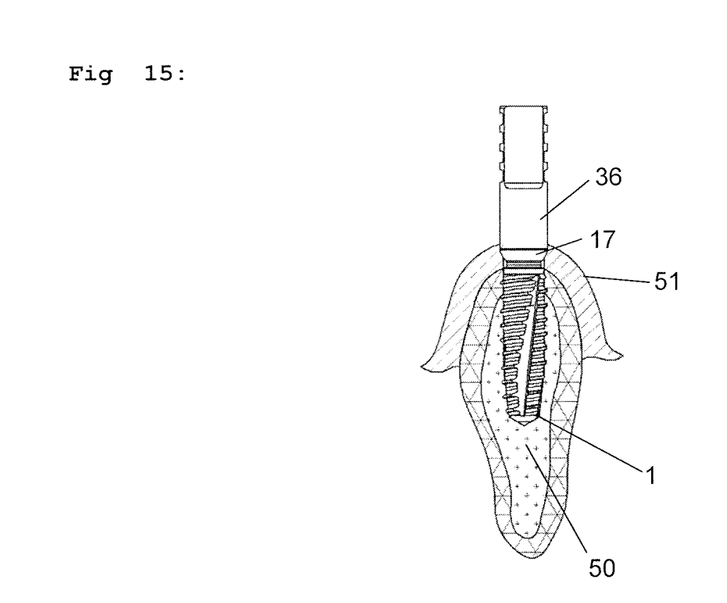
FIG. 15 shows a schematic view of the jawbone with soft tissue according to FIG. 13, with a received impression part according to the invention.

FIGS. 12 to 15 are schematic views of a jawbone 50 with soft tissue 51 arranged thereon. FIG. 12 shows how, by means of a drilling tool 46, a drilled hole is created in the jawbone 50. FIG. 13 shows schematically how a dental implant 1 with secondary part 17 is anchored in the drilled hole. In FIG. 14, a gingiva former 34 is received as a tertiary part on the secondary part 17 as shown in FIG. 13. In FIG. 15, instead of the gingiva former, an impression part 36 is received which can function as a scanning body, as an impression body, as a temporary restoration or as an incorporation cap.

Figure 16:
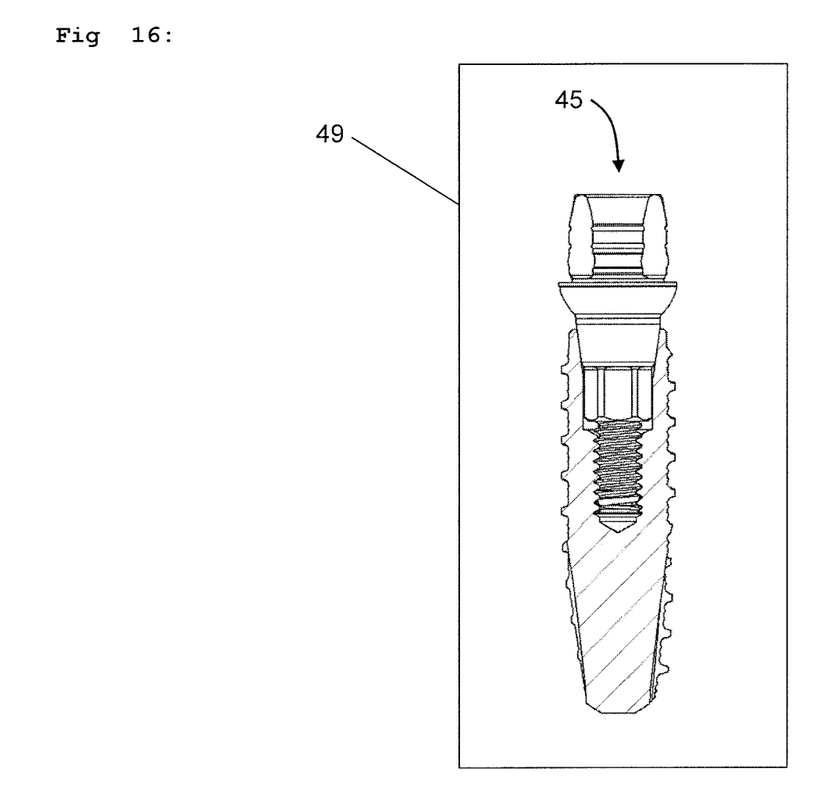
FIG. 16 shows a schematic view of a package according to the invention containing a pre-assembled set according to the invention.

FIG. 16 is a schematic view showing a package 49 which comprises a set 45 consisting of a pre-assembled dental implant with secondary part, comprising a means of screwing the dental implant into the jawbone.

Figure 17:
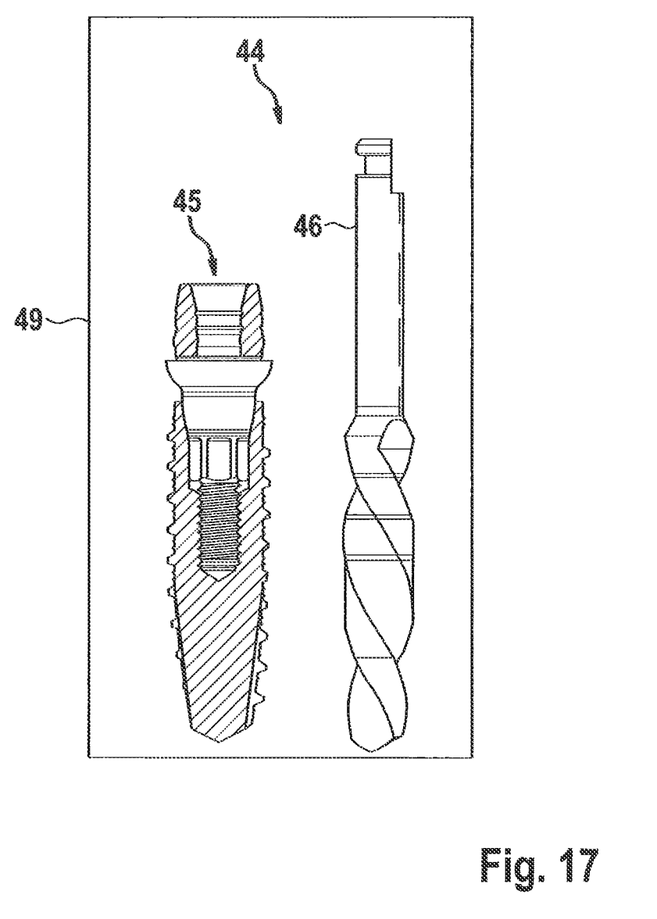
FIG. 17 shows a schematic view of a dental implant system according to the invention comprising the set according to the invention and a drilling tool.

FIG. 17 is a schematic view showing a dental implant system 44 comprising the set 45 and a drilling tool 46 in a package 49.

The invention claimed is:

1. A dental implant for insertion into a jawbone, for use with a secondary part for attachment to a dental implant and suitable for receiving an auxiliary part or a tertiary part, wherein the secondary part comprises:
    a secondary-part body with a recess on an inside,
    a secondary-part screw being able to be accommodated within the recess,
    wherein the secondary part has a screwing-in mechanism in the form of a contour for receiving a screwing-in tool, for screwing in the dental implant into a jawbone, if said dental implant is connected to the secondary part,
    wherein at least the secondary-part screw has a self-retaining structure for engaging with the screwing-in tool, and the self-retaining structure is formed by a resilient head, and
    wherein an outside of the secondary-part body is formed in such way that during intended use of the secondary part, the outside of the secondary part conically tapers inwardly, at least in part, at a coronal end region on which the auxiliary part or the tertiary part can be received, such that the secondary-part body has a coronal cone extending partially in the circumferential direction, wherein the angle between the longitudinal axis of the secondary-part body and the conical portion is between 5° and 15°,
    for use with a set comprising the dental implant and the secondary part,
    the dental implant comprising an external thread with a thread root for anchoring the dental implant in the jawbone,
    wherein the thread root has at least one elevation extending from the thread root and being located between two adjacent thread flanks, and wherein at least two cutting grooves are arranged in the area of the external thread, wherein the cutting grooves are formed as twisted cutting grooves, and in that at least one short cutting groove and at least one long cutting groove is provided, wherein the short cutting groove is shorter than the long cutting groove, and
    wherein the short cutting groove extends from the apical end and runs across the apical area, starting from the apical end.

2. The dental implant according to claim 1, wherein the long cutting groove along the longitudinal axis of the dental implant runs across at least the entire external thread.

3. The dental implant according to claim 1, wherein the external thread covers at least 85% of the length of the dental implant.

4. The dental implant according to claim 1, wherein the dental implant has a cylindrical shape in a coronal area directed towards the coronal end.

5. The dental implant according to claim 1, wherein the dental implant, in an apical area directed towards the apical end, tapers conically towards the apical end.

6. The dental implant according to claim 5, wherein said dental implant is designed as a truncated cone.

7. The dental implant according to claim 1, wherein the short cutting groove runs across half the length of the external thread.

8. The dental implant according to claim 1, wherein the at least one short cutting groove includes an end directed towards the coronal end of the implant, and wherein a groove distance parallel to the longitudinal axis of the dental implant from said end of the groove to the coronal end is in the range of 3.5 mm to 4.5 mm.

9. The dental implant according to claim 1, wherein at the thread root has at least two elevations arranged between two adjacent thread flanks of the external thread, in such a way that three channels are arranged at the thread root between the two adjacent thread flanks.

10. The dental implant according to claim 1, wherein the diameter of the at least one elevation corresponds to the diameter of a drilling tool used to insert the dental implant.

11. The dental implant according to claim 1, wherein the at least one elevation is arranged parallel to a thread flank of the external thread.

12. The dental implant according to claim 1, wherein the at least one elevation in a direction perpendicular to the longitudinal axis of the dental implant is smaller than the two adjacent thread flanks.

* * * * *